Patented Dec. 2, 1941

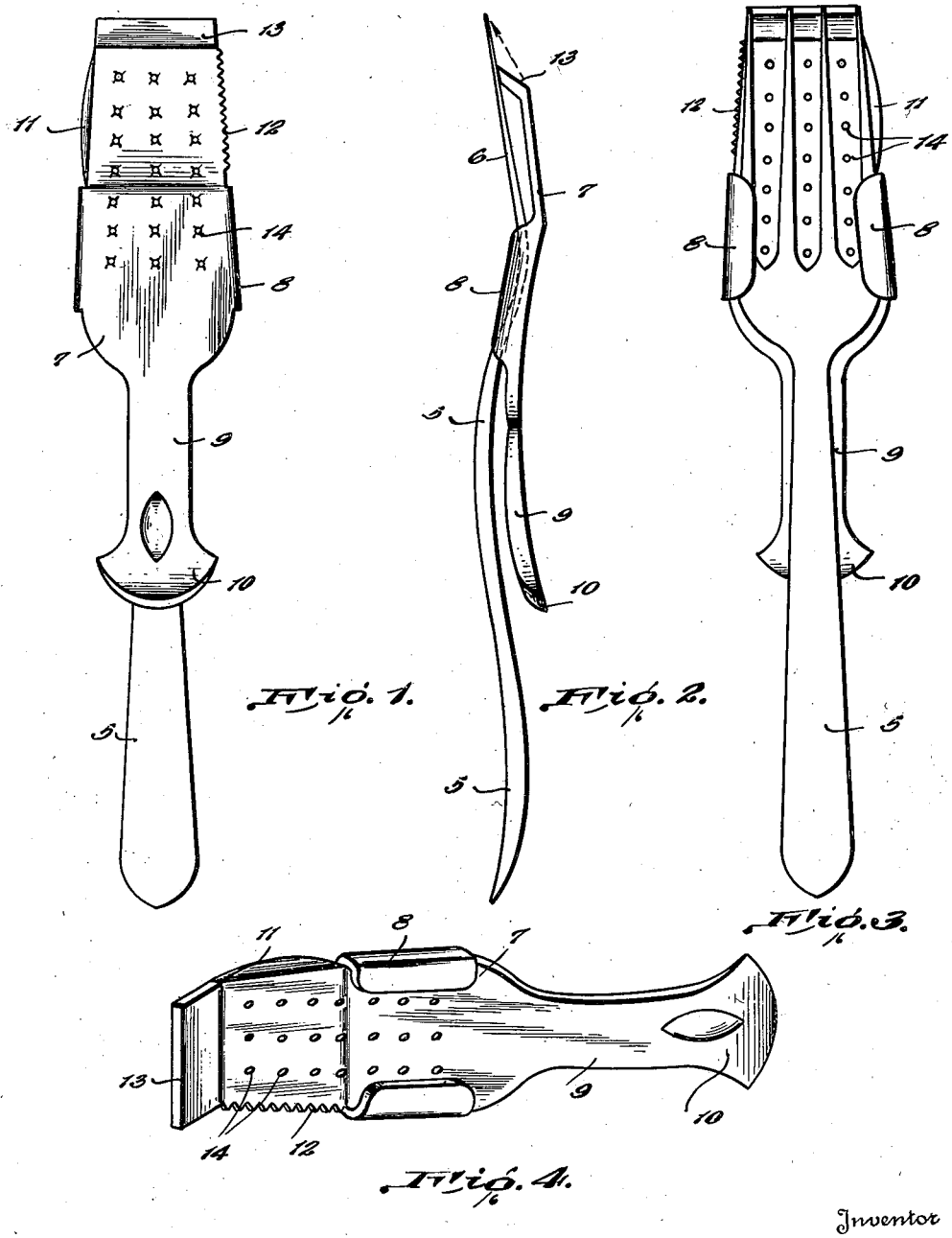

2,265,012

UNITED STATES PATENT OFFICE 2,265,012

ATTACHMENT FOR FORKS

Henry W. Earp-Thomas, New York, N. Y.

Application November 3, 1939, Serial No. 302,657

4 Claims. (Cl. 30—129)

This invention relates to attachments for forks and more particularly to a food ejector which may be operated to dislodge food impaled upon the tines of the fork.

A further object of the invention resides in providing a device of the character described which may be readily attached to a conventional fork and which is designed so that it may be used as a grater, scraper, or cutter, as well as a food ejector.

Another object of the invention resides in providing a device of the character described which is simple and durable in construction, efficient in use, and inexpensive to manufacture.

Other objects and advantages of the invention will be apparent from the following description.

In the accompanying drawing forming a part of this specification and in which like numerals are employed to designate like parts throughout the same, Fig. 1 is a top plan view of the device applied to a fork, Fig. 2 is a side elevation of the same, showing in dotted lines the position of the ejector when moved backward, Fig. 3 is a view similar to Fig. 1, showing the reverse side of the fork, and Fig. 4 is a perspective view of the device detached from the fork.

In the drawing, wherein for the purpose of illustration I have shown a preferred embodiment of my invention, the numeral 5 denotes a conventional fork having the usual tines 6. A metal plate 7 is slidably mounted on the back of the tines by means of upwardly and inwardly bent ears 8 extending from the side edges of the plate and adapted to engage over the outermost tines 6. The inner end of the plate is reduced in width to form a handle portion 9 which is curved to conform to the contour of the fork handle and the end of the portion 9 is turned upwardly to provide a thumb piece 10 by means of which the plate 7 is moved longitudinally of the tines 6. The plate 7 is slightly wider than the tines so that its side edges project beyond the outermost tines, the edge 11 being sharpened to provide a cutter while the opposite edge is serrated, as at 12, to provide a scraper. The forward end of the plate 7 is bent downwardly and forwardly, as at 13, so as to tightly press upon the tines 6 to eject the food therefrom when the plate is moved forward. The plate 7 is provided with a series of perforations 14 struck upwardly from the plate to provide a grater surface.

In use, the plate 7 may be readily mounted on a conventional fork and is slidably retained thereon by the ears 8 which permit free longitudinal movement of the plate. The forward end 13 of the plate is resiliently held in contact with the tines 6 and upon forward movement of the plate by pressing the thumb piece 10, any food impaled on the tines will be ejected therefrom. The cutting edge 11 may be used to cut various foods and the scraper 12 will also be found useful for preparing foods. The grating surface 14 permits foods to be grated, so that it is seen the device may be used for various purposes other than ejecting food from the fork. The device when used for other purposes may be removed from the fork or may be used for such purposes while still on the fork.

It is to be understood that the form of my invention herein shown and described is to be taken as a preferred example of the same, and that certain changes in the shape, size, and arrangement of the parts may be made without departing from the spirit of the invention or the scope of the subjoined claims.

Having thus described my invention, I claim:

1. The combination with a fork having tines, of an elongated plate of greater width than the tines slidably mounted on the back of the tines, the forward end of said plate being bent downwardly and forwardly to resiliently engage the tines, and means for moving said plate longitudinally of the tines.

2. The combination with a fork having curved tines, of an elongated plate extending longitudinally of the convex surface of the tines, said plate being of a width greater than the tines ears bent upwardly and inwardly from the sides of said plate to extend over the outermost tines, a scraping edge at the forward end of said plate bent forwardly and downwardly into resilient engagement with the tines, and means for moving said plate longitudinally of the tines.

3. The combination with a fork having curved tines, of an elongated plate extending longitudinally of the convex surface of the tines, said plate being of a width greater than the tines ears bent upwardly and inwardly from the sides of said plate to extend over the outermost tines, a scraping edge at the forward end of said plate bent forwardly and downwardly into resilient engagement with the tines, and a thumb piece at the inner end of said plate for moving said plate longitudinally of the tines.

4. The combination of a fork having curved tines, of an elongated flat plate extending longitudinally of the convex surface of the tines and disposed in spaced relation thereto with its forward end inclined downwardly and forwardly into resilient engagement with the tines, flanges along the sides of said plate intermediate its length bent to extend over the outermost tines whereby said plate is slidably mounted for longitudinal movement of the fork, and a finger piece at the inner end of said plate for manually sliding said plate.

HENRY W. EARP-THOMAS.